United States Patent Office 2,827,361
Patented Mar. 18, 1958

2,827,361

REMOVAL OF DISSOLVED SILICON VALUES FROM GERMANIUM SOLUTIONS

Yurii E. Lebedeff, Metuchen, N. J., and William H. Wetherill, Tottenville, N. Y., assignors to American Smelting and Refining Company, New York, N. Y., a corporation of New Jersey No Drawing. Application October 17, 1955
Serial No. 541,089

4 Claims. (Cl. 23—140)

This invention relates to removal of silicon values dissolved in an aqueous non-acid solution of germanium and especially to removing silicon values from a caustic solution of this type.

The invention is particularly useful in connection with recovering germanium values from materials containing same by a process which involves leaching such materials with an alkaline solution such as aqueous sodium hydroxide, acidifying the resulting leach solution, precipitating germanium values from the latter as sulphide usually by adding a material such as sodium hydrosulphide to the acidified solution, and separating the precipitated germanium sulphide from the solution in any suitable manner such as by filtration.

During the caustic leach, silicon values are unavoidably dissolved due to the presence of silicon values in the material being leached. However, the presence of such silicon values in the solution is undesirable as they tend to interfere with the subsequent separation and purification of the germanium values in the solution. Moreover, during the acidification step, the dissolved silicon values are precipitated as a gelatinous precipitate which is filtered only with great difficulty. In addition, this gelatinous precipitate is highly absorbent and retains unduly large amounts of germanium values which are lost to the process.

One of the principal objects and advantages of the invention is that it avoids substantial formation of the above-described gelatinous precipitate. Another object and advantage is that the invention provides a process in which the silicon values are removed in a bulk separation from a non-acid solution as a readily filtrable precipitate which retains relatively minor amounts of germanium values. These and other objects and advantages of the invention will become apparent from the following more detailed description of the invention.

Broadly, the invention comprehends removing silicon values from an aqueous non-acid solution of germanium containing same by adding soluble aluminum values to the solution and separating the resulting precipitate therefrom.

The invention is based on the discovery that silicon values are precipitated from such solutions as a readily filtrable precipitate in the form of an alkali metal aluminum silicate, which in general has been found to be a nephelite, without at the same time precipitating germanium values. It has been found that such precipitates are formed in neutral or alkaline solutions; that is to say, solutions having a pH value of 7.0 and above.

Any soluble aluminum values may be added in the solution in practicing the invention. They may be added as such or formed in the solution. For example, aluminum sulphate, sodium or potassium aluminate, aluminum oxide and metallic aluminum may be used. Where metallic aluminum is used, the solution should be maintained alkaline to the extent of the equivalent of about 10 grams per liter of sodium hydroxide to insure dissolving of the added metal.

Likewise, the invention may be practiced with any neutral or alkaline solution containing dissolved silicon and germanium values. Preferably, the solution is an alkaline solution comprised of sodium salts of sodium hydroxide. Sodium aluminate is the preferred precipitating agent for the silicon values. Although the solution may contain any amount of dissolved germanium and silicon, in general, solutions containing about 1–15 grams of dissolved germanium and 10–120 grams of dissolved silicon are encountered.

It has been found that the alkali metal aluminum silicate precipitate is formed in approximately stoichiometrical proportions with the aluminum values added to the solution. It has also been found that germanium values are occluded in the precipitate and that the amount occluded remains at a substantially constant low amount (below about 10% of the germanium present in the solution) as the ratio of the added aluminum values to the dissolved silicon values is increased up to the point where about 70% of the silicon values present in the solution are precipitated. Thereafter, the amount of occluded germanium increases gradually with increased ratios of aluminum to silicon when precipitating from about 70 to about 90% of the dissolved silicon values. When precipitation of the silicon values is carried above about 90%, occlusion of the germanium values increases sharply. In the preferred mode of practicing the invention, amounts of silicon values up to about 90% of those present in the solution are precipitated, and in the most preferred procedure, about 70–90% of these values are precipitated.

The solution may be maintained at any desired temperature during the precipitation step. It has been found that, in general, there is less occlusion of germanium in the precipitate with solution temperatures of 70° C. and above; and such temperatures, especially those in the range of 70–90° C., are preferred in conducting the precipitation.

The invention is further illustrated in the following examples. It should be understood, however, that the examples are given for purposes of illustration and that the invention in its broader aspects is not limited thereto.

Solutions having the compositions set forth in the following table were prepared by leaching relatively high silica-germanium containing materials with hot sodium hydroxide solutions. Reagents having aluminum values calculated as Al in the amounts indicated, were added to the solution. In each case the aluminum reagent was added as a concentrated solution, except where metallic aluminum was used. In the latter instances the metallic aluminum was slowly added, as such, in the form of a powder. The temperature of the solution in each case was 70–90° C. In each case, to insure a complete reaction, the solutions were stirred for one-half hour after all the aluminum reagent was added. Thereafter, the solution was filtered; and the filtrate and filter cake were analyzed. The results obtained are set forth in the table. In each of the examples, a free filtering precipitate was formed which was readily and easily filtered from the solution.

| Example | Initial Solution, g./l. | | | Ppt., g./l., Al Values | Percent Si Values ppted. | Percent Ge Occluded in ppt. |
|---|---|---|---|---|---|---|
| | Ge | SiO$_2$ | NaOH | | | |
| 1 | 8.2 | 16.6 | 15.0 | 2.7 Al$_2$(SO$_4$)$_3$ | 48 | 9.1 |
| 2 | 8.2 | 16.6 | 15.0 | 3.9 Al$_2$(SO$_4$)$_3$ | 68 | 9.5 |
| 3 | 8.2 | 16.6 | 15.0 | 5.4 Al$_2$(SO$_4$)$_3$ | 89 | 19.3 |
| 4 | 8.2 | 16.6 | 15.0 | 2.7 NaAlO$_2$ | 51 | 7.1 |
| 5 | 8.2 | 16.6 | 15.0 | 4.0 NaAlO$_2$ | 68 | 5.7 |
| 6 | 8.2 | 18.6 | 17 | 6.5 NaAlO$_2$ | 80 | 8.6 |
| 7 | 8.2 | 16.6 | none | 5.3 NaAlO$_2$ | 80 | 11.2 |
| 8 | 13 | 47 | 45 | 13.4 Al | 71 | 7.0 |
| 9 | 15.5 | 32.5 | 46 | 14.4 Al | 92 | 13.0 |
| 10 | 8.2 | 19.3 | 46 | 5.7 Al | 97 | 25.0 |
| 11 | 14.8 | 16.1 | 46 | 4.1 Al | 73 | 4.0 |

It will be noted that silicon values were precipitated in approximately stoichiometrical amounts with the added aluminum values. It will be noted further that as the percentage of precipitation of the silicon values increased, the retention of germanium values in the precipitate remained substantially constant up to a point where about 70% of the dissolved silicon values in the solution were precipitated. The retention increased gradually when silicon in amounts about 70–90% of that present in the solution was precipitated and thereafter the germanium retention increased sharply. In addition, it will be noted that for any given percentage removal of silicon values, the germanium retention, when using aluminum sulfate as the precipitate, was higher than that obtained with sodium aluminate or aluminum metal.

An ignited portion of the precipitate after drying and igniting was found to contain 41.7% $SiO_2$, 35.0% $Al_2O_3$, and 19.2% $Na_2O$ as compared to the calculated composition of sodium nephelite of 42.2% $SiO_2$, 36% $Al_2O_3$, and 21.8% $Na_2O$. An X-ray defraction analysis of the ignited precipitate was made. A definite defraction pattern was obtained which corresponded to that of the mineral nepheline.

The retention of germanium values in the precipitate was found to be due to physical retention rather than to precipitation inasmuch as no precipitate was formed when the procedure of the above examples was repeated with solutions that contained no silicon values.

What is claimed is:

1. A method of removing dissolved silicon values contained in an aqueous solution having dissolved germanium values therein and having a pH value of at least 7 which comprises adding soluble inorganic aluminum values to the solution whereby insoluble silicon values are precipitated from the solution, and separating the resulting silicon-containing precipitate from the solution.

2. A process according to claim 1 in which said solution is an aqueous sodium hydroxide solution, and said aluminum values are added in amount sufficient to precipitate from about 70 to 90% of the dissolved silicon values originally present in the solution.

3. A process according to claim 2 in which the temperature of said solution is maintained in the range of 70 to 90° C. during said precipitation step.

4. A process according to claim 3 in which sodium aluminate is the added soluble aluminum value.

References Cited in the file of this patent

UNITED STATES PATENTS

| | | |
|---|---|---|
| 1,812,347 | Kuhnert | June 30, 1931 |
| 2,390,687 | Boericke et al. | Dec. 11, 1945 |